(12) United States Patent
Jungerman

(10) Patent No.: US 7,339,720 B2
(45) Date of Patent: Mar. 4, 2008

(54) FREQUENCY MULTIPLIED OPTICAL ELECTRONIC OSCILLATOR

(75) Inventor: Roger L. Jungerman, Petaluma, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 315 days.

(21) Appl. No.: 11/134,744

(22) Filed: May 20, 2005

(65) Prior Publication Data

US 2006/0262386 A1  Nov. 23, 2006

(51) Int. Cl.
*G02F 1/35* (2006.01)
*G02F 2/02* (2006.01)

(52) U.S. Cl. .................. 359/328; 359/326; 359/329

(58) Field of Classification Search ......... 359/325–332
See application file for complete search history.

(56) References Cited

U.S. PATENT DOCUMENTS 5,007,717 A * 4/1991 Cutolo et al. ............... 359/328
5,410,561 A * 4/1995 Ogawa ....................... 372/22
2003/0174926 A1* 9/2003 Oikawa et al. ............. 385/14

OTHER PUBLICATIONS

Yao, X. Steve et al, "Optoelectronic Oscillator for Photonic Systems," IEEE Journal of Quantum Electronics, vol. 32, No. 7, p. 1141-1149, (Jul. 1996).

* cited by examiner

*Primary Examiner*—Michelle R. Connelly-Cushwa

(57) ABSTRACT

The present invention is directed to systems and methods which provide a widely tunable, low-noise, synthesized microwave source with an OEO oscillator.

20 Claims, 4 Drawing Sheets

FREQUENCY MULTIPLIED OPTICAL ELECTRONIC OSCILLATOR

BACKGROUND OF THE INVENTION

Photonic systems use a combination of radio-frequency (RF) technology and optical technology to transport signals, and can be used for an opto-electronic oscillator (OEO). The oscillator uses the light energy to produce pure microwave signals. A typical oscillator comprises an optical modulator that is supplied with light from a low-noise laser source, a delay fiber, and a light detector. The detector forms an electrical signal that is amplified and filtered, and then is used to control the modulator. The modulator encodes or modulates the light from the light source with the electrical signal. The modulated light is then passed through the delay fiber, which introduces a delay in the light, and is then provided to the light detector. The light detector then converts the received light into the electrical signal that is used provided to the optical modulator.

The frequency at which the OEO oscillates can be controlled by placing a frequency selective element within the electronic portion of the loop. Also, the frequency at which the OEO oscillates can be controlled by placing a frequency selective element within the optical portion of the loop. For further information see "Optoelectronic Oscillator for Photonic Systems, Yao, X. S. et al, IEEE Journal of Quantum Electronics, Vol. 32, No. 7, July 1996, pgs 1141-1149, which is hereby incorporated herein by reference.

BRIEF SUMMARY OF THE INVENTION

The present invention is directed to systems and methods which provide a widely tunable, low-noise, synthesized microwave source with an OEO oscillator.

In one arrangement, the optical modulator is driven to produce at least a first pair of harmonic frequencies (with respect to the fundamental modulator frequency) about the fundamental optical frequency. One or more filters pass only the first pair of harmonic frequencies, and remove the other frequencies including the fundamental optical frequency. The photodetector then forms an electric signal that is equal to the difference between the pair of harmonic frequencies. The difference signal is a multiple of two of the fundamental modulator frequency. The difference signal is provided as an output from the OEO oscillator. One or more divide-by-two prescalers are used to reduce the difference signal back down to the fundamental modulator frequency.

In another arrangement, the optical modulator is driven to produce at least a third pair of harmonic frequencies (with respect to the fundamental modulator frequency) about the fundamental optical frequency. A coupler is used to split the light into two portions. One portion of light is used to provide the fundamental modulator frequency signal that is provided to the modulator. The other portion of light is used to provide an output from the OEO oscillator. The other portion of light is provided to one or more filters that pass only the third pair of harmonic frequencies, and remove the other frequencies including the fundamental optical frequency. A photodetector then forms an electric signal that is equal to the difference between the pair of harmonic frequencies. The difference signal may not be a multiple of two of the fundamental modulator frequency. The difference signal is provided as an output from the OEO oscillator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Embodiments of the invention use OEO concepts to provide different and/or higher frequencies by operating the OEO at harmonics of the modulator fundamental frequency. It is an advantage of at least one embodiment of the invention to use a lower bandwidth modulator (and hence less expensive) to generate a higher frequency output using an OEO oscillator.

Figure 1:
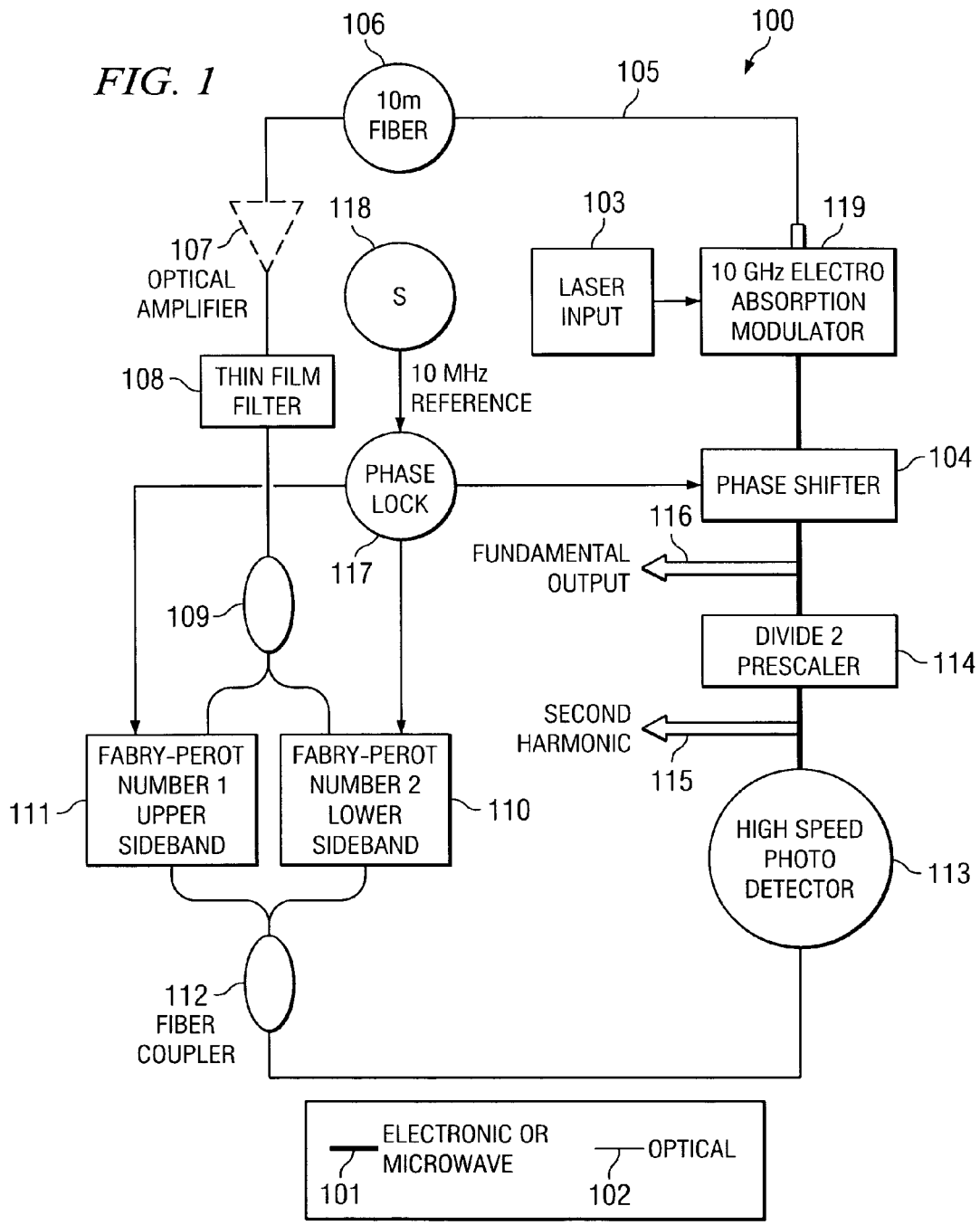
FIG. 1 is an example of an OEO oscillator according to embodiments of the invention.

FIG. 1 depicts an example of an optical electronic oscillator (OEO) according to embodiments of the invention. The OEO 100 is a second harmonic OEO with a prescaler. The OEO comprises an electronic or microwave portion 101 and an optical portion 102. The electronic portion includes a phase lock 117 that receives a reference signal, e.g. a 10 MegaHertz (MHz), from signal source 118. The phase lock 117 controls the phase shifter 104 to lock the OEO to a specific multiple of the reference frequency.

The phase shifter 104 provides an electronic signal to modulate the light of the laser input 103 via modulator 119. Changing the phase shifter 104 (via the phase lock 117) causes the phase frequency of the OEO to shift. Thus, the phase shifter tunes the frequency of the OEO to force the oscillation to be locked to a harmonic of the reference signal 118, e.g. a 10 MHz signal. For example, an OEO using a modulator with a 10 GigaHertz (GHz) modulation bandwidth may be set to oscillate at 10.1 GHz. Note that the OEO frequency can also be set to non-integer multiples of the reference frequency by using a fractional-n divider, as is typical for frequency synthesis.

The laser source provides light with a frequency that is several magnitudes greater than the fundamental frequency of the modulation. For example, the light may have a fundamental frequency on the order of $10^{14}$ Hertz (Hz) (or a wavelength of about 1550 nanometers), while modulator may have a fundamental on the order of 10 GHz.

Figure 3A:
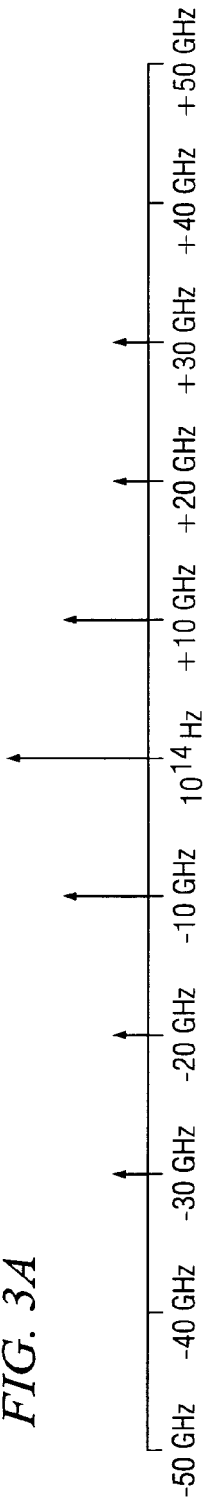
FIGS. 3A-3C depict the frequency spectrum of light at different points in the system of FIG. 1.

The light from the laser source 103 is encoded with the 10 GHz modulation signal by the modulator 119. In other words, the light of the laser is amplitude and/or phase modulated with the modulation signal. In the frequency domain, the modulated light signal comprises a center frequency having the frequency of the laser light, and at least one pair of side bands located about the center frequency and spaced apart from the center frequency by the frequency of the modulation signal (i.e. plus and minus the modulation signal frequency). For example, the center frequency (or fundamental) may be at $10^{14}$ Hz, and the side bands may be located 10 GHz from the center frequency, as shown in FIG. 3A. The modulator may be driven to produce additional side bands, e.g. second and third harmonics. Thus, by selectively driving the modulator, other harmonic bands may be encoded into the light.

The modulated light is then coupled with a optical fiber 105, which includes a length of fiber to provide additional optical delay, e.g. loop 106. The longer the loop 106, the more delay added to the light, such that a smaller frequency shift will cause the phase to change. Thus, longer loops (and hence longer delays) are desirable to place the frequency of the oscillation to be nearly exactly at the desired value and reduce the phase noise. The length of the loop 106 may be 10 meters.

Optical amplifier 107 may be optionally used to boost the modulated light prior to filtering.

Figure 3B:
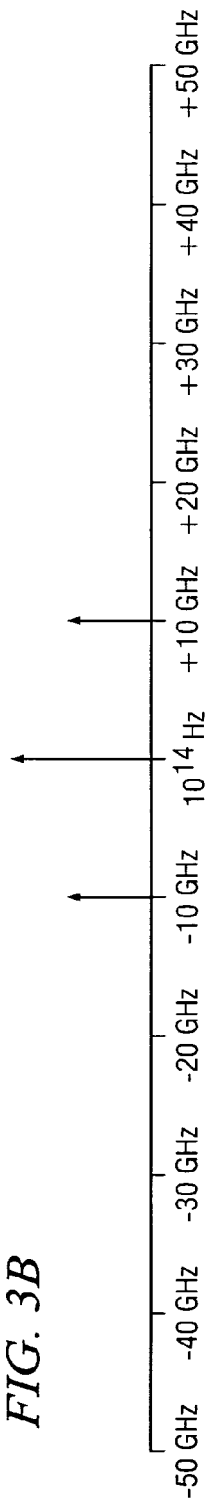

The modulated light is then filtered by thin film filter 108, e.g. a wavelength division multiplexing filter. In this arrangement, the thin film filter 108 passes the center frequency and the first set of side bands and blocks the remainder, as shown in FIG. 3B. Note that in other arrangements other side bands may be passed and/or blocked. For example, second or third harmonic bands may be passed.

After filtering by filter 108, the light passes into fiber coupler 109, which splits the light into two paths. Each path passes into a respective narrow pass band filter, e.g. a Fabry-Perot filter. Each filter 110, 111 is tuned to pass a narrow range of frequency at side bands. For example, filter 110 passes the upper side band (e.g. the +10 GHz frequency) and the filter 111 passes the lower side band (e.g. the −10 GHz frequency). The filters 110, 111 are connected to the phase lock 117 to allow for the filters to be tuned to a desired frequency. The phase lock will set the center frequency of the phase shifter 104 as well as the filters 110, 111.

Note that the arrangement of thin film filter 108 and filters 110, 111 is by way of example only, as another filter, other filters, and/or filter combinations could be used, so long as the desired frequencies are passed with noise as low as can be tolerated. Fabry-Perot filters tend to pass narrow bands of frequencies, but has a periodic response such that several periods of narrow bands would be passed. The use of the thin film filter removes the light that may be passed by the Fabry Perot in a period band.

Figure 3C:
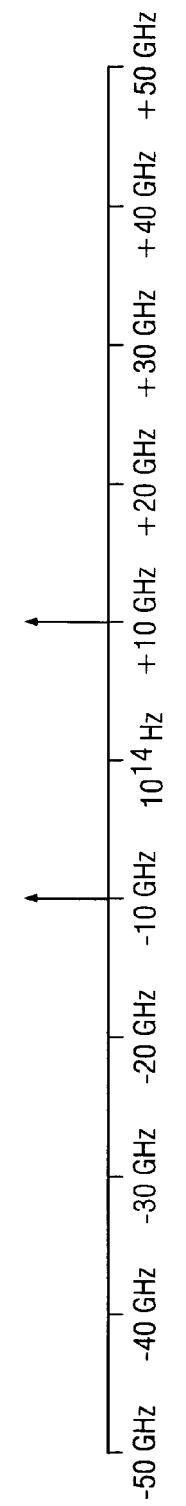

After filtering by filters 110, 111, the light passes into fiber coupler 112, which recombines the light into a single path. In this arrangement, the center frequency has been filtered out, leaving the first set of side bands, as shown in FIG. 3C. Thus, the two bands are separated by 20 GHz.

The light is then provided to the high-speed photodetector 113, which produces an electric signal that has a frequency that represents the difference between the two received frequencies, e.g. 20 GHz. A tap 115, allows the 20 GHz signal to be provided as an output for use by another device and/or with another application.

To allow the OEO oscillator to oscillate, the input signal that is provided to the modulator should approximate the output signal, thus, a divide-by-2 prescaler 114 is provided in the oscillating loop to divide the 20 GHz signal down to a 10 GHz signal. The value of the phase shifter 204 is chosen so there is an integral number of wavelengths around the combined electrical loop and the optical loop at the desired frequency of interest. An optional tap 116, allows the 10 GHz signal to be provided as an output for use by another device and/or with another application.

Figure 2:
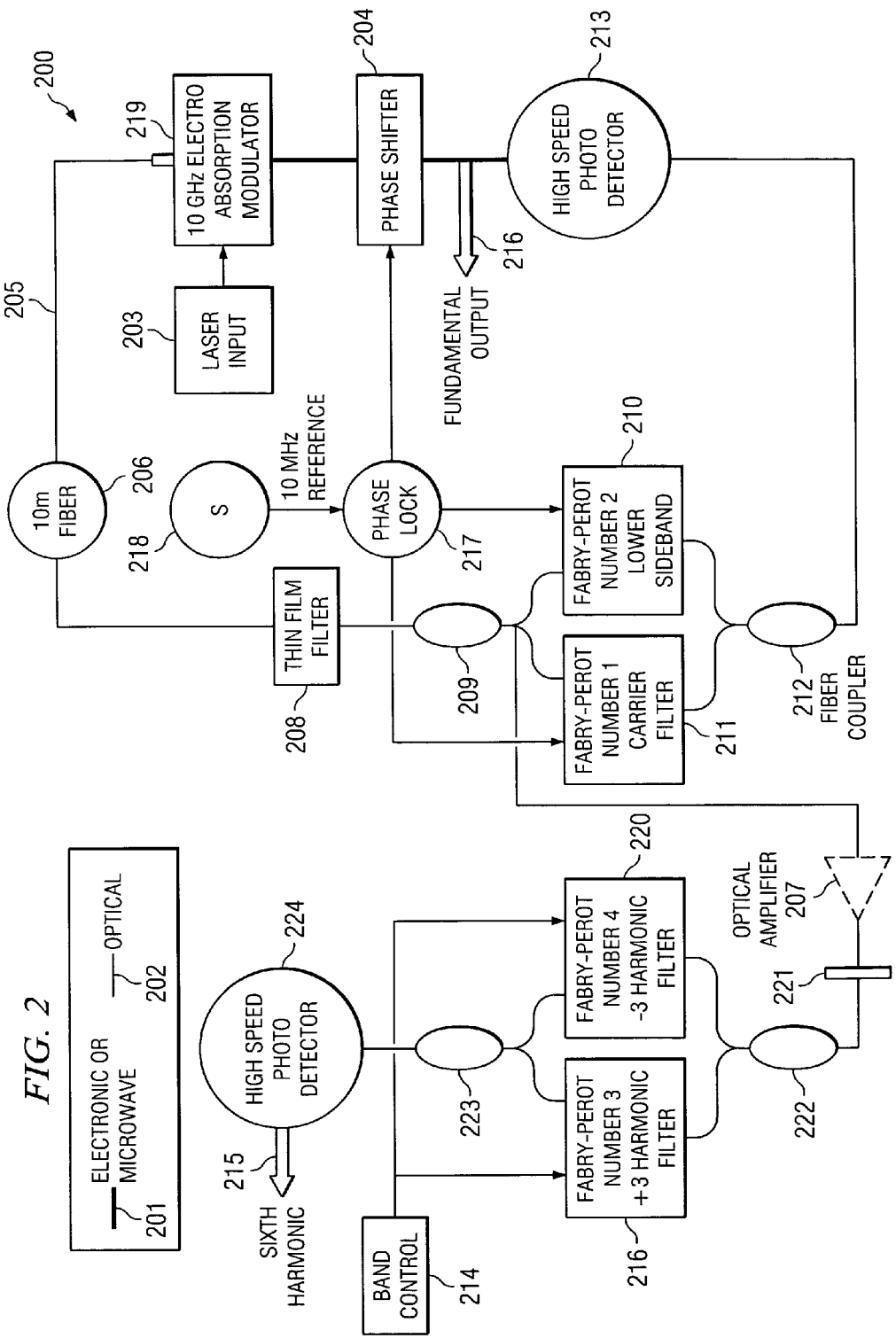
FIG. 2 is another example of an OEO oscillator according to embodiments of the invention.

FIG. 2 depicts another example of an optical electronic oscillator (OEO) according to embodiments of the invention. The OEO 200 is a sixth harmonic OEO with a separate detector. The OEO comprises an electronic or microwave portion 201 and an optical portion 202. The electronic portion includes a phase lock 217 that receives a reference signal, e.g. a 10 MegaHertz (MHz), from signal source 218. The phase lock 217 controls the phase shifter 204 to lock the OEO to a specific frequency.

The phase shifter 204 provides an electronic signal to modulate the light of the laser input 203 via modulator 219. Changing the phase shifter 204 (via the phase lock 217) causes the phase frequency of the OEO to shift. Thus, the phase shifter tunes the frequency of the OEO to force the oscillation to be locked to a harmonic of the reference signal 218, e.g. a 10 MHz signal. For example, a 10 GigaHertz (GHz) OEO may be set to oscillate at 10.1 GHz. Note that the OEO frequency can also be set to non-integer multiples of the reference frequency by using a fractional-n divider, as is typical for frequency synthesis.

The laser source provides light with a frequency that is several magnitudes greater than the frequency of the modulation. For example, the light may have a frequency on the order of $10^{14}$ Hertz (Hz) (or a wavelength of about 1550 nanometers), while modulation of the light may be on the order of 10 GHz.

Figure 4A:
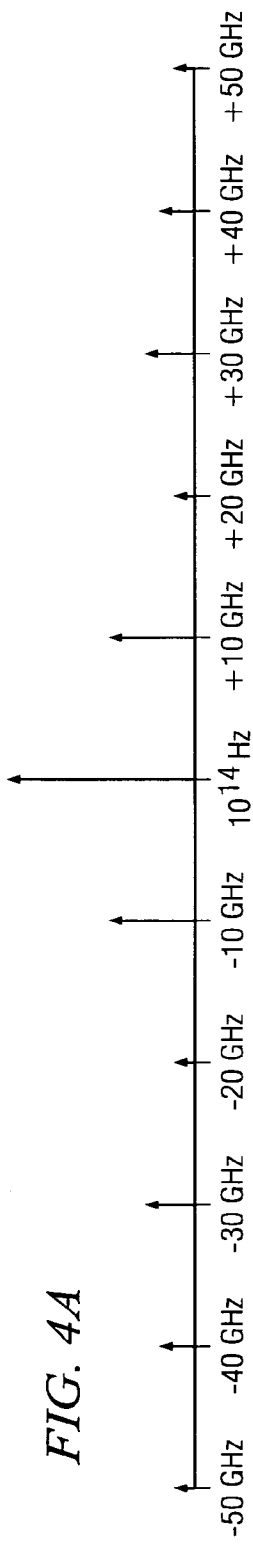
FIGS. 4A-4C depict the frequency spectrum of light at different points in the system of FIG. 2.

The light from the laser source 203 is encoded with the 10 GHz modulation signal by the modulator 219. In other words, the light of the laser is amplitude and/or phase modulated with the modulation signal. In the frequency domain, the modulated light signal comprises a center frequency having the frequency of the laser light, and at least one pair of side bands located about the center frequency and spaced apart from the center frequency by the frequency of the modulation signal (i.e. plus and minus the modulation signal frequency). For example, the center frequency may be at $10^{14}$ Hz, and the side bands may be located 10 GHz from the center frequency, as shown in FIG. 4A. In this example, the modulator is driven to produce additional side bands, i.e. third harmonics.

The modulated light is then coupled with a optical fiber 205, which includes a length of fiber to provide additional optical delay, e.g. loop 206. The longer the loop 206, the more delay added to the light, such that a smaller frequency shift that will cause the phase to change. Thus, longer loops (and hence longer delays) are desirable to place the frequency of the oscillation to be nearly exactly at the desired value and reduce the phase noise. The length of the loop 206 may be 10 meters.

An optical amplifier (not shown) may be optionally used to boost the modulated light prior to filtering.

Figure 4B:
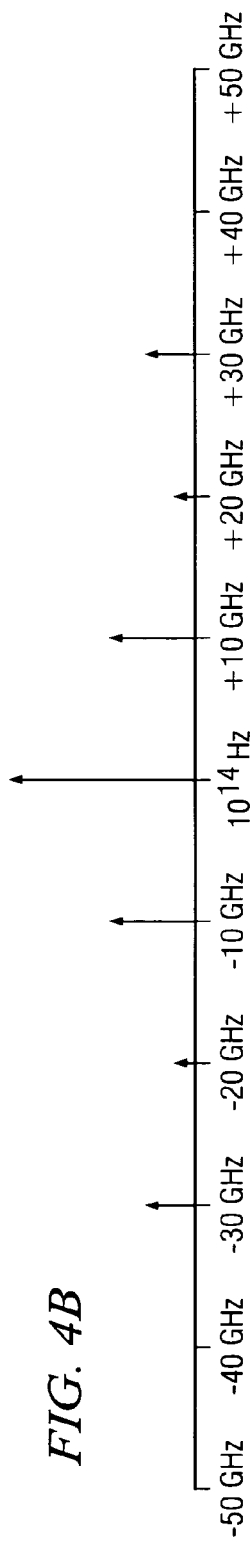

The modulated light is then filtered by thin film filter 208, e.g. a wavelength division multiplexing filter. In this arrangement, the thin film filter 208 passes the center frequency and up to the third set of side bands and blocks the remainder, as shown in FIG. 4B. Note that in other arrangements other side bands may be passed and/or blocked.

After filtering by filter 208, the light passes into fiber coupler 209, which splits the light into three paths. Two of the paths are used to produce the fundamental frequency, namely the modulation signal. The third path is used to provide the $6^{th}$ harmonic output.

Each path of the two of the paths are passed into a respective narrow pass band filter, e.g. a Fabry-Perot filter. Each filter 210, 211 is tuned to pass a narrow range of frequencies. For example, filter 210 passes one of the side bands (e.g. lower side band or the −10 GHz frequency) and the filter 211 passes the fundamental (i.e. the $10^{14}$ Hz frequency). The filters 210, 211 are connected to the phase lock 217 to allow for the filters to be tuned to a desired frequency. The phase lock will set the center frequency of the phase shifter 204 as well as the filters 210, 211.

Note that the arrangement of thin film filter 208 and filters 210, 211 is by way of example only, as another filter, other filters, and/or filter combinations could be used, so long as the desired frequencies are passed with noise as low as can be tolerated. Fabry-Perot filters tend to pass narrow bands of frequencies, but has a periodic response such that several periods of narrow bands would be passed. The use of the thin film filter removes the light that may be passed by the Fabry Perot in a period band.

After filtering by filters 210, 211, the light passes into fiber coupler 212, which recombines the light into a single path. In this arrangement, the center frequency has been passed, along with one of the side bands. Thus, the two bands are separated by 10 GHz.

The light is then provided to the high-speed photodetector 213, which produces an electric signal that has a frequency that represents the difference between the two received frequencies, e.g. 10 GHz. A tap 216, allows the 10 GHz signal to be provided as an output for use by another device and/or with another application.

The third path provides light to an optical amplifier 207 that may be optionally used to boost the modulated light prior to filtering.

The light is then optionally filtered by optional thin film filter 221, which is similar to filter 208. In this arrangement, the thin film filter 221 passes the center frequency and the third set of side bands and blocks the remainder, as shown in FIG. 4B. Note that in other arrangements other side bands may be passed and/or blocked.

After filtering by filter 221, the light passes into fiber coupler 222, which splits the light into two paths. Each path passes into a respective narrow pass band filter, e.g. a Fabry-Perot filter. Each filter 216, 220 is tuned to pass a narrow range of frequencies. For example, filter 216 passes one of the side bands (e.g. upper side band or the −30 GHz frequency) and the filter 220 passes the other side band (e.g. lower side band or the +30 GHz frequency). The filters 216, 220 are connected to the band control circuitry 214 to allow for the filters to be tuned to a desired frequency.

Note that the arrangement of thin film filter 221 and filters 216, 220 is by way of example only, as another filter, other filters, and/or filter combinations could be used, so long as the desired frequencies are passed with noise as low as can be tolerated. Fabry-Perot filters tend to pass narrow bands of frequencies, but has a periodic response such that several periods of narrow bands would be passed. The use of the thin film filter removes the light that may be passed by the Fabry Perot in a period band.

Figure 4C:
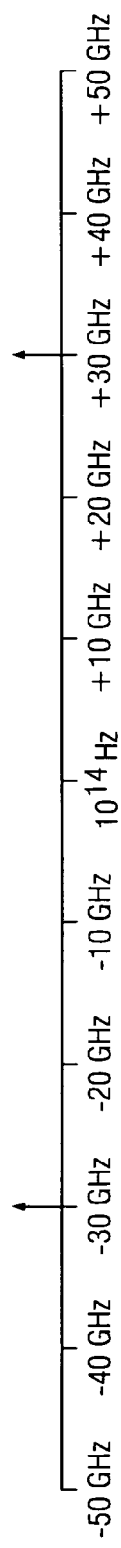

After filtering by filters 216, 220, the light passes into fiber coupler 223, which recombines the light into a single path. In this arrangement, the center frequency, and the first and second sets of side bands have been filtered out, leaving the third set of side bands, as shown in FIG. 4C. Thus, the two bands are separated by 60 GHz.

The light is then provided to the high-speed photodetector 224, which produces an electric signal that has a frequency that represents the difference between the two received frequencies, e.g. 60 GHz. A tap 215, allows the 60 GHz signal to be provided as an output for use by another device and/or with another application.

The arrangement of FIG. 1 is preferable for harmonics that are a factor of two, as one or more divide by 2 prescalers may be used to provide the fundamental or modulating signal, while the arrangement of FIG. 2 is more useful for non-factor of two harmonics.

Note that the arrangements of FIGS. 1 and 2 use a 10 GHz electro absorption modulator, however other modulators may be used. For example, a 40 GHz Mach Zehnder modulator may be used in the arrangement of FIG. 1 to produce a 80 GHz signal or used in the arrangement of FIG. 2 to produce a 240 GHz signal. If the fundamental frequency of the OEO can be tuned, e.g. from 2-10 GHz, then the output can also be tuned from 2-20 GHz (for the arrangement of FIG. 1) or from 2-60 GHz (for the arrangement of FIG. 2). Most optical modulators have some nonlinearity that can be used to produce harmonics if driven hard. A Lithium Niobate Mach Zehnder modulator is particularly controllable in this regard. It has a sinusoidal transfer function (voltage to optical intensity). Biasing it at full-off point, even harmonics are produced. Biased in quadrature, odd harmonics are obtained. Intermediate bias points produce a controllable mixture of both.

Also note that the arrangements of FIGS. 1 and 2 may use other harmonics, for example any of the harmonics from 1-6, or even higher.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for forming an electronic signal comprising:
providing light having an optical fundamental frequency;
modulating the light, via a modulator, to encode at least one set of harmonics onto the light, wherein said harmonics include harmonics of a modulating signal that drives the modulator, said harmonics comprising sidebands;
filtering the encoded light to substantially remove the optical fundamental frequency; and converting the filtered light into the electronic signal, wherein the electronic signal has a frequency that is greater than that of the modulating signal that drives the modulator.

2. The method of claim 1, further comprising:
passing the encoded light through an optical fiber loop to provide delay to the encoded light.

3. The method of claim 1, further comprising:
prior to filtering, optically amplifying the encoded light.

4. The method of claim 1, wherein filtering comprises:
passing the encoded light through a first filter that passes light having the fundamental optical frequency and light having the frequency of the at least one set of harmonies; and
passing the light from the first filter through another filter that passes the light having the frequency of the one set of harmonics and substantially blocking the light having the frequency of the optical fundamental frequency to form the filtered light.

5. The method of claim 4, wherein the first filter is a thin film filter and the another filter is at least one Fabry-Perot filter.

6. The method of claim 4, wherein the another filter comprises a second filter and a third filter, and the passing the light from the first filter through a second filter comprising:
separating the light from the first filter into two paths;
filtering the light on the first path with the second filter that passes light having the frequency of the upper side band of the at least one set of harmonics;
filtering the light on the second path with a third filter that passes light having the frequency of the lower side band of the at least one set of harmonics; and
combining the filtered light on the first path with the filtered light on the second path to form the filtered light.

7. The method of claim 6, further comprising:
controlling, via a phase lock, a passband of the second filter and a passband of the third filter.

8. The method of claim 1, further comprising:
reducing a frequency of the electronic signal to form the modulating signal.

9. The method of claim 1, wherein modulating the light comprises:
driving the optical modulator to produce the at least one set of harmonics.

10. The method of claim 1, further comprising:
phase shifting the modulating signal to change the frequency of the modulating signal.

11. The method of claim 10, further comprising:
providing a reference signal to change modulating signal to a harmonic of the reference signal;
wherein the reference signal has a frequency that is a fraction of the frequency of the modulating signal.

12. The method of claim 10, further comprising:
controlling, via a phase lock, the phase shifting of the modulating signal.

13. The method of claim 1, wherein the electronic signal has a frequency that is at least twice that of the modulating signal.

14. A method for forming an electronic signal comprising:
providing light having an optical fundamental frequency;
modulating the light, via a modulator, to encode at least one set of harmonics onto the light;
filtering the encoded light to substantially remove the optical fundamental frequency;
converting the filtered light into the electronic signal, wherein the electronic signal has a frequency that is greater than that of a modulating signal that drives the modulator; and
prior to converting, separating the encoded light into two paths;
wherein the encoded light that is on the first path is convened into the electronic signal;
and the encoded light that is on the second path is converted into the modulating signal.

15. The method of claim 14, wherein filtering comprises:
passing the encoded light on the first path through a first filter that passes light having the fundamental optical frequency and light having the frequency of the at least one set of harmonics; and
passing the light from the first filter through a second filter that passes the light having the frequency of the one set of harmonics and substantially blocking the light having the frequency of the optical fundamental frequency to form the filtered light.

16. The method of claim 14, further comprising:
passing the encoded light on the second path through a first filter that passes light having the fundamental optical frequency and light having the frequency of the at least one set of harmonics;
passing the light from the first filter through a second filter that passes the light having the frequency of one of the upper sideband and the lower sideband of the one set of harmonics and passes the light having the frequency of the optical fundamental frequency;
converting the light from the second filter into the modulating signal.

17. An opto-electronic oscillator (OEO) comprising:
means for modulating light having an optical fundamental frequency with a modulating signal to encode at least one set of harmonics onto the light, wherein said harmonics include harmonics of a modulating signal that drives the modulator, said harmonics comprising sidebands;
means for filtering the encoded light to substantially remove the optical fundamental frequency; and
means for converting the filtered light into the electronic signal, wherein the electronic signal has a frequency that is greater than that of the modulating signal.

18. The OBO of claim 17, wherein the means for filtering comprises:
first means for filtering the encoded light to pass light having the fundamental optical frequency and light having the frequency of at least one set of harmonics of the encoded modulating signal; and
second means for filtering the light from the first means to pass the light having the frequency of the one set of harmonics and substantially block the light having the frequency of the optical fundamental frequency to form the filtered light.

19. The OBO of claim 17, further comprising:
means for reducing a frequency of the electronic signal to form the modulating signal.

20. The OBO of claim 17, further comprising:
means for phase shifting the modulating signal to change the frequency of the modulating signal.

* * * * *

UNITED STATES PATENT AND TRADEMARK OFFICE
CERTIFICATE OF CORRECTION

PATENT NO. : 7,339,720 B2 Page 1 of 1
APPLICATION NO. : 11/134744
DATED : March 4, 2008
INVENTOR(S) : Jungerman It is certified that error appears in the above-identified patent and that said Letters Patent is hereby corrected as shown below:

In column 7, line 14, in Claim 4, delete "harmonies;" and insert -- harmonics; --, therefor.

In column 7, line 51, in Claim 11, after "change" insert -- the --.

In column 8, line 8, in Claim 14, delete "convened" and insert -- converted --, therefor.

In column 8, lines 18-19, in Claim 15, delete "haying" and insert -- having --, therefor.

In column 8, line 47, in Claim 18, delete "OBO" and insert -- OEO --, therefor.

In column 8, line 58, in Claim 19, delete "OBO" and insert -- OEO --, therefor.

In column 8, line 62, in Claim 20, delete "OBO" and insert -- OEO --, therefor.

Signed and Sealed this

Fifteenth Day of July, 2008

JON W. DUDAS
*Director of the United States Patent and Trademark Office*